Patented Jan. 23, 1923.

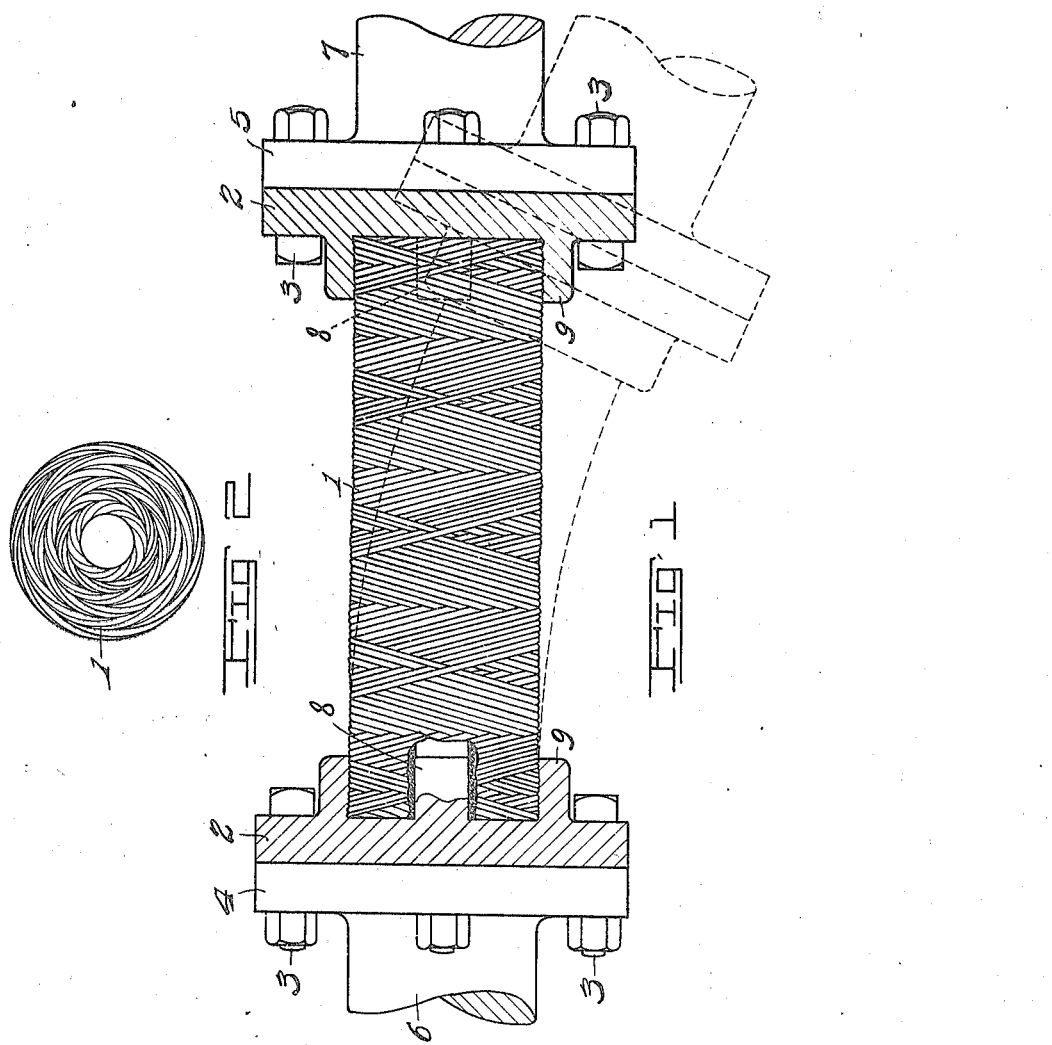

1,443,148

UNITED STATES PATENT OFFICE.

FRANK D. SAYLOR, OF WHEELING, WEST VIRGINIA.

FLEXIBLE COUPLING.

Application filed September 27, 1921. Serial No. 503,516.

*To all whom it may concern:*

Be it known that I, FRANK D. SAYLOR, a citizen of the United States of America, and resident of Wheeling, county of Ohio, and State of West Virginia, have invented certain new and useful Improvements in Flexible Couplings, of which the following is a specification.

This invention relates broadly to shaft couplings, and it has for its primary object to provide a flexible connection between driving and driven shafts or parts, as between the drive shaft of a motor vehicle and the transmission gearing and between such shaft and the differential gearing.

A further object is to provide a coupling which possesses relatively great flexibility and which is therefore particularly adapted for use where a wide range of angular adjustments of the connected parts is required.

A still further object is to provide a flexible coupling which is self-adjusting both angularly and longitudinally and which disposed in coupling relation is incapable of permitting rotary movement of one of the coupled parts with respect to the other.

Another object is to provide a device of the character mentioned which requires no lubrication and in which wear is so slight as to be practically negligible.

With these and other objects in view, the invention resides in the features of construction which will hereinafter be fully described, reference being had to the accompanying drawings, in which—

Figure 1 is a sectional elevation of the invention, illustrating its application, and—

Figure 2 is an end elevation of the cylinder, detached.

Referring to said drawings, 1 indicates a hollow cylinder formed of a single length of metal wire having an universal winding— that is, a wire spirally wound to provide numerous closely coiled helixes, alternately dextrorsal and sinistrorsal, disposed in closely superposed binding relation.

Rigidly carried upon opposite ends of the cylinder 1 are coupling plates or disks 2 designed for attachment, as by means of bolts 3, to end plates or flanges 4 and 5 formed on the shafts 6 and 7 which are to be coupled. While any suitable means of attachment between the cylinder 1 and the coupling disks 2 may be employed, it is preferred that the discs be cast upon the cylinder, the ends of the latter being embedded in the mold during the process of casting the discs, so that intimate interlocking engagement is had between the castings and the cylinder at the extreme ends of the latter and throughout the lengths of the cylinder-bore-entering stems 8 and the cylinder-embracing hub portions 9 of the discs.

The cylinder possesses great flexibility both longitudinally and angularly, due to the character of the winding, but it possesses practically no torsional flexibility, due to the intimate binding relation between the superposed helixes of which it is composed. As is manifest, angular and longitudinal adjustment occurs with such slight relative movement of the individual coils that practically no friction is encountered and that, consequently, wear is negligible. It will be further evident that, for the reasons stated, little or no lubrication is required.

What is claimed is—

1. A flexible coupling comprising a cylinder formed of a single length of wire wound spirally to provide numerous closely coiled helixes arranged in superposed binding relation, and coupling means carried on opposite ends of said cylinder.

2. A flexible coupling comprising a cylinder formed of a single length of wire wound spirally to provide numerous closely coiled helixes arranged in superposed binding relation, and coupling discs rigidly carried on the opposite ends of said cylinder.

3. A flexible shaft coupling comprising a cylinder formed of a single length of wire spirally wound to provide a plurality of closely coiled helixes, alternately to the right and to the left, disposed in closely superposed binding relation, and coupling disks rigidly carried by the opposite ends of said cylinder.

4. A flexible shaft coupling comprising a hollow cylinder formed of a single length of wire spirally wound to provide a plurality of closely coiled helixes, alternately to the right and to the left, disposed in closely superposed binding relation, and coupling disks carried by the opposite ends of said cylinder, each of said disks having a hub portion secured to the hollow cylinder internally thereof, and an annular flange portion secured to the cylinder externally thereof.

In testimony whereof, I affix my signature in presence of a subscribing witness.

FRANK D. SAYLOR.

Witness:
H. E. DUNLAP.